United States Patent [19]

Ardizio

[11] 4,098,524
[45] Jul. 4, 1978

[54] SAFETY BELT FOR MOTOR VEHICLE

[76] Inventor: Pierre Ardizio, Rue de Saint-Jean 21, 1203 Geneva, Switzerland

[21] Appl. No.: 764,159

[22] Filed: Jan. 31, 1977

[30] Foreign Application Priority Data

Feb. 5, 1976 [CH] Switzerland .................... 1398/76

[51] Int. Cl. .............................................. B60r 21/02
[52] U.S. Cl. .................................................. 280/744
[58] Field of Search ...................... 280/744, 749, 745; 297/389

[56] References Cited

U.S. PATENT DOCUMENTS

| | | | |
|---|---|---|---|
| 3,754,775 | 8/1973 | Williams | 280/747 |
| 3,831,974 | 8/1974 | Keppel | 280/745 |
| 3,865,397 | 2/1974 | Pilhall | 280/745 |
| 3,997,190 | 12/1976 | Seiffert | 280/747 |

Primary Examiner—Robert R. Song
Attorney, Agent, or Firm—Silverman, Cass & Singer, Ltd.

[57] ABSTRACT

A safety belt system for a motor vehicle having both ends of the main belt or strap secured or anchored, one removably, to the side of the motor vehicle. An intermediate anchoring point is provided by an auxiliary strap connected at one end to a self-rolling device affixed to the motor vehicle applying tension to the auxiliary strap and at the other end to a sliding strap buckle through which the main belt or strap is slidably engaged. The end anchoring points of the main belt are located at different levels with the removably anchored end being substantially at the seat level of the motor vehicle. The motor vehicle further includes one or more retaining hooks which hooks may be deformable and which are located at the top of the motor vehicle door. The hook may be at the front of the seat which may be combined with a hook in the plane of the back of the seat or the hook may be in the middle of the top of the motor vehicle. The main belt is placed over the hook by the user when the belt is not in use.

7 Claims, 3 Drawing Figures

U.S. Patent
July 4, 1978
4,098,524
FIG. 1
FIG. 2
FIG. 3
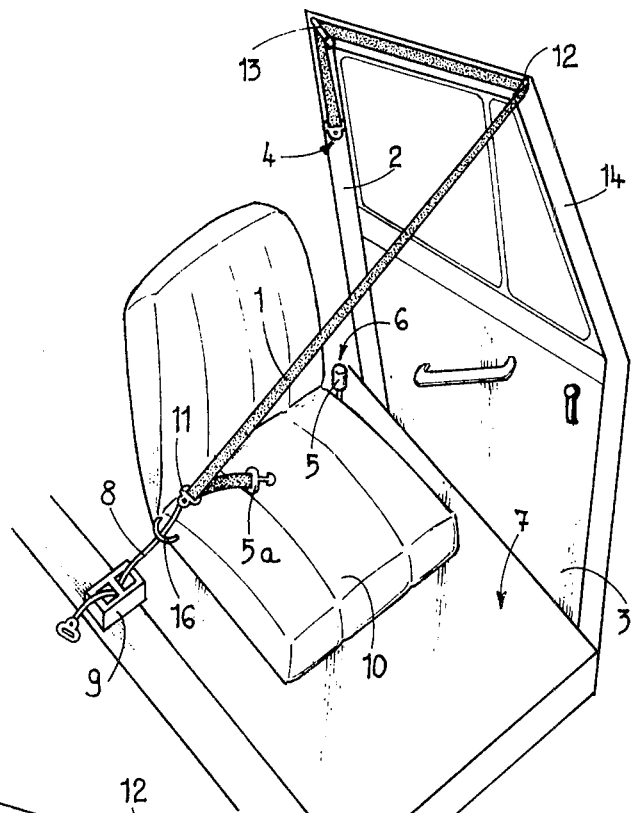
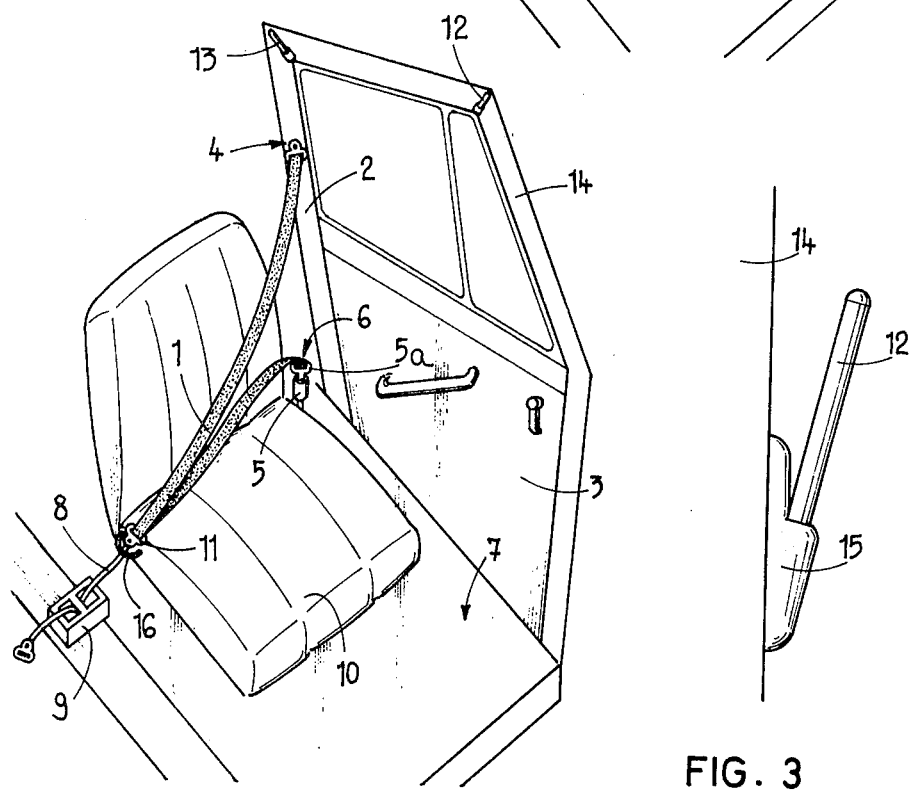

SAFETY BELT FOR MOTOR VEHICLE

The present invention relates to a safety belt, for motor vehicle, comprising a main strap anchored to three points on the frame of the vehicle and an auxiliary strap, situated on the inner side of the seat of the user, which provides the connection between the main strap and its intermediate anchoring point by means of a sliding strap buckle arranged in such manner that the main strap can slide therein, the two other anchoring points of the main strap to which this strap is secured by its ends being situated on the external side of the user's seat, at levels different from each other, one of which is substantially the level of the seat of the vehicle.

Belts of the above mentioned type are known. The anchoring point to which the main strap is removably secured is constituted, in such belts, by an intermediate point situated on the inner side of the seat of the user. In some embodiments, the auxiliary strap is missing, the sliding buckle being secured, removably, directly to the intermediate anchoring point. In this case, the anchoring at one of the two other points is effected by means of a self-rolling device exerting on the strap a traction which causes the near totality of the strap to pull back when the belt is not used.

Such types of belts all have numerous drawbacks, especially owing to the fact that the strap is doubled at the point where it can be unfastened, which condition frequently leads to its entanglement when the belt is not in service. The sliding buckle at the intermediate anchoring point slides along the strap when the belt is not in service and is often difficult to be picked up by the user when the latter settles himself on his seat. Moreover, the removable tie point is located in the center of the vehicle which makes it difficult for a rescuer to get at it when attempting to release an unconscious passenger from his belt.

These belts have other drawbacks since, for instance, they are difficult to install at the rear of the vehicle, because no anchoring point where the strap can be removably secured is available in the middle of the back seat. Also belts equipped with a self-rolling device are practically impossible to be fitted in the rear of the vehicle because the self-rolling device must be situated in the same vertical line as the upper anchoring point, at a point where the embossing for the wheel passages prevents its installation.

The object of the present invention is to remedy these drawbacks.

To this effect, the safety belt according to the invention is characterized by the fact that the main strap is removably secured to the anchoring point situated on the outer side of the seat, at the same level as of the latter whereas at the intermediate anchoring point, the auxiliary strap is subjected to the action of a selfrolling device for exerting thereon a pulling action which is transmitted to the main strap, fastening means situated substantially at the level of the top of the door of the vehicle, for maintaining the main strap, when the belt is not in service, in a position whereby the user can sit on his seat or leave it freely.

The drawing shows, by way of example, one embodiment of the object of the invention.

FIG. 1 is a perspective view of the front left seat of a motor-car provided with a safety belt represented in its rest position, taking into account that only the elements necessary to the good understanding of the invention have been represented.

FIG. 2 is a similar view of the same seat, the belt represented being in its working position, and FIG. 3 is an elevational view of a detail at a larger scale.

The safety belt represented comprises a main portion 1 secured to the upright post, designated by 2, of the door 3 of the vehicle at an anchoring point 4 and, removably, by means of a fastener 5, to an anchoring point 6, at the bottom 7 of the body of the vehicle or at one of the side members of the frame thereof. This anchoring point 6 could also be located on the upright post 2. This belt comprises an auxiliary strap 8 constituted by a cable which is secured to the bottom of the body of the vehicle or to a side member of the frame thereof through the medium of a self-rolling device. The latter, not represented, is located in a casing 9 fitted between the two seats of the vehicle, of which only the left one, designated by 10, has been represented. This auxiliary strap 8 is connected to the main strap 1 through the medium of a sliding buckle 11 in which the strap 1 can slide.

The strap comprises, moreover, two hooks 12 and 13, one being secured to the frame 14 of the body constituting the frame of the door and the other to the upright post 2, both substantially at the level of the top of the door 3. The hook 12 is placed ahead the user while the hook 13 is placed substantially in the plane of the back of the seat. Each of these hooks comprises a rod, inclined with respect to the vertical direction (FIG. 3), and the lower end of which is fitted in a mounting made of rubber 15.

The belt, as disclosed and represented, is used as follows:

When not in service, in the position represented in FIG. 1, the strap 1 is rested on the two hooks 12 and 13 so that the belt position ensures free access to the seat 10 and the user can sit thereon or leave it easily. The strap 1 being stretched between the hooks 12 and 13 and the sliding buckle 11, there is no risk that it becomes entangled, especially as it is a single member and not a double one as is the case when the strap is removably secured to the intermediate anchoring point.

Moreover, when the belt is at rest, in the position represented in FIG. 1, the upper member of the strap 1 rests substantially in the eyes level of the user sitting on the seat, so that the user can not possibly forget that he has not fastened his belt and get started running unattached. In the case of the driver, the belt thus suspended would also interfere with his driving operation.

When the user is sitting, he only needs exercising a traction on the upper member of the main strap 1 to cause the deformation on the base of the two hooks 12 and 13 and, thus, produce the unhooking of the strap 1. It is not even necessary for him, if he does not want so, to lift up the hand and reach these two hooks. Moreover, the fact that these hooks are deformable prevents them from constituting a hazard in case of bump.

When the user has unhooked the upper member of the strap 1 from the two hooks 12 and 13, he only has to exert, with the left hand, a traction on the strap, the free end of which provided with one of the elements, designated by 5a, of the fastener 5 being always accessible in the vicinity of the sliding buckle 11, to give him the possibility of fastening the strap 1 at the anchoring point 6, by mean of the fastener. The self-rolling device produces then a slight pull on the strap 1, through the medium of the cable 8 and of the sliding buckle 11. In the example represented, the cable 8 passes through an horizontal ring 16, secured to the seat 10, on the inner side of this seat, so that the sliding loop 11 occupies always the same position when the belt is at rest, which condition facilitates the operation consisting in catching the element 5a of the fastener.

As a modification, one could visualize the case where the hooks 12 and 13, instead of being formed from rigid rods fitted in a resilient and deformable mounting, would themselves be made of a deformable material.

One could also consider eliminating the hook 13 and connecting the strap 1 at the upright post 2 by means of an elastic wire, that will save the user from having to stretch the arm for placing the strap 1 on the hook, since the strap would be self-driven toward the upright post under the pulling effect of the elastic wire. Obviously, the force of traction exerted by this wire would be much lower than that of the self-rolling device. One could also produce with a semi-rigid material the first portion of the strap 1, starting from its anchoring point 4, along a length corresponding to the distance separating this point 4 from the top of the door 3. This semi-rigid portion would then be subjected to the action of a weaker return spring for pushing it back against the upright post 2, directed upwards, in the position represented in FIG. 1.

As another modification, the ring 16, instead of being secured to the seat, as in the example represented, could be secured, horizontally, to the end of a vertical rod secured to the bottom of the vehicle.

Finally, the hook 12, and even the two hooks 12 and 13 situated at the outer side of the seat of the user could be replaced by only one point of attachment situated on the roof of the vehicle, at the center thereof. The hooking step would then be easier, the user only having to stretch the arm upwardly, without even having to bend forward. However, the belt at rest will lie above the head of the user and not in front of his eyes, so that he will not be reminded that he may have omitted to fasten it, which arrangement will be less favourable in the countries where belt fastening is obligatory.

It is to be noted that the self-rolling device used here can be less cumbersome than in the case of conventional belt systems due to the fact that it rolls up only the length necessary to allow for the differences resulting from the position of the seat and from the size of the user, as well as from movements of the latter. The self-rolling device rolls up a strap length which is lower by at least 80 cm than the length of the strap it should swallow when the belt is in the rest position, as is in the present cases. Moreover, the auxiliary strap can be a cable, since it is not in contact with the body of the user, which condition permits further reducing the dimension of the self-rolling device and facilitates the operation thereof, since the rolling up of a cable of circular section is obviously easier than the rolling up of a flat strap. Hence, both self-rolling devices, being of smaller size, can be put together in only one casing, at the center of the vehicle, betwen the two seats, or in the middle of the rear seat, or under this seat, or, further, in the rear boot, the cables 8 passing through the back seat through rigid or semi-rigid sleeves. Moreover, the device which ensures the locking of the belt can be the same for the two self-rolling devices, whereby the construction is rendered cheaper.

In case of accident, unfastening by an outsider is easier, the anchoring point to which the strap is removably fastened being situated on the outer side of the seat of the user and not on the inner side.

What I claim is:

1. A safety belt system for a motor vehicle comprising:
    a main belt having both ends anchored to the frame of said motor vehicle on the external side of a user's seat, a first one of said ends removably secured to an anchoring point substantially at the same level as the seat, a second one of said ends fixedly secured at a different level from said first end;
    an auxiliary strap situated on the inner side of said user's seat, a first end of said auxiliary strap connected to a self-rolling device applying tension to said strap, the second end of said auxiliary strap connected to a sliding strap buckle;
    said main strap being slidably engaged through said sliding strap buckle, said buckle exerting tension against said main strap; and
    first fastening means located substantially at the level of the top of the door on the external side of said user's seat for retaining the main strap when the strap is not in service so that a user may freely leave said seat.

2. A safety belt system as claimed in claim 1 wherein:
    said fastening means is located at the front portion of said door such that when the main strap is hooked thereto a portion of this strap lies substantially in a position where it would obstruct the vision of a user seated in said seat.

3. A safety belt system as claimed in claim 2 further including:
    second fastening means located substantially at the level of the top of said door on the external side of said user's seat substantially in the plane of the back o said seat for further retaining the main strap in conjunction with said first fastening means when the strap is not in service.

4. A safety belt system as claimed in claim 2 wherein:
    said first and second fastening means include a rod secured to the frame of said motor vehicle in an inclined position with respect to the vertical and inclined inward from the frame of the vehicle, behind which rod the main strap may be retained when the strap is not in service.

5. A safety belt system as claimed in claim 4 wherein:
    said rod is resiliently deformable so that said strap may be unhooked from said rod by an exertion in the downward direction on said main strap.

6. A safety belt system as claimed in claim 1 wherein:
    said first fastening means is located substantially in the center of said motor vehicle roof so that a portion of the strap will lie above the head of the seated user when the main strap is retained therein.

7. A safety belt system as claimed in claim 1 wherein:
    said auxiliary strap is formed from a substantially cylindrical cable.

\* \* \* \* \*